US011820314B1

(12) United States Patent
Song et al.

(10) Patent No.: US 11,820,314 B1
(45) Date of Patent: Nov. 21, 2023

(54) SEAT AIRBAG

(71) Applicant: HYUNDAI MOBIS CO., LTD., Seoul (KR)

(72) Inventors: Jiwoon Song, Yongin-si (KR); Jong Seob Lee, Suwon-si (KR); Dong Gil Lee, Yongin-si (KR); Byung Ho Min, Yongin-si (KR); Sang Won Hwangbo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/079,096

(22) Filed: Dec. 12, 2022

(30) Foreign Application Priority Data

Jul. 27, 2022 (KR) .................. 10-2022-0093266

(51) Int. Cl.
*B60R 21/207* (2006.01)
*B60R 21/231* (2011.01)

(52) U.S. Cl.
CPC ...... *B60R 21/207* (2013.01); *B60R 21/23138* (2013.01); *B60R 2021/23146* (2013.01)

(58) Field of Classification Search
CPC ............ B60R 21/107; B60R 21/23138; B60R 2021/23146
See application file for complete search history.

(56) References Cited

U.S. PATENT DOCUMENTS

| 6,062,594 | A | 5/2000 | Asano et al. |
| 6,270,113 | B1 * | 8/2001 | Wipasuramonton ........................ B60R 21/23138 280/730.2 |
| 8,528,934 | B2 * | 9/2013 | Kobayshi .............. B60R 21/233 280/730.2 |
| 9,598,043 | B2 * | 3/2017 | Kobayashi .............. B60R 21/26 |
| 11,299,121 | B2 * | 4/2022 | Lee ........................ B60R 21/213 |
| 11,383,670 | B2 * | 7/2022 | Yamamoto ........ B60R 21/23138 |
| 11,518,339 | B2 * | 12/2022 | Kobayashi ............ B60R 21/233 |
| 2004/0130127 | A1 | 7/2004 | Kurimoto et al. |
| 2009/0184500 | A1 | 7/2009 | Feller et al. |
| 2015/0367806 | A1 * | 12/2015 | Fujiwara ............... B60R 21/233 280/729 |
| 2021/0122318 | A1 | 4/2021 | Yoo et al. |
| 2021/0402946 | A1 | 12/2021 | Song et al. |
| 2022/0227327 | A1 * | 7/2022 | Jo ........................ B60R 21/217 |

FOREIGN PATENT DOCUMENTS

| EP | 3275738 A1 | 1/2018 | |
| KR | 20110012749 A | 2/2011 | |
| WO | WO-2014115351 A1 * | 7/2014 | ....... B60R 21/23138 |

OTHER PUBLICATIONS

Extended European Search Report dated Jun. 30, 2023 in corresponding European patent application No. 22213708.5.

* cited by examiner

*Primary Examiner* — Faye M Fleming
(74) *Attorney, Agent, or Firm* — Novo TechIP International PLLC

(57) ABSTRACT

A seat airbag includes a cushion part mounted to a seatback of a seat, at least two chambers connected to each other in a vertical direction of the seatback, and an inflator provided to supply inflating gas to the cushion part.

19 Claims, 4 Drawing Sheets

SEAT AIRBAG

CROSS-REFERENCE TO RELATED APPLICATIONS

The present application claims priority to Korean Patent Application No. 10-2022-0093266, filed Jul. 27, 2022, the entire contents of which is incorporated herein for all purposes by this reference.

TECHNICAL FIELD

The present invention relates generally to a seat airbag mounted to a seat of a vehicle.

BACKGROUND

A seat of a vehicle is often configured to take various postures according to the user's convenience. Specifically, the seat has often a reclining function to tilt a seatback at a desired angle in forward and rearward directions of the seat.

In an event of a vehicle collision, a curtain airbag may be provided in a vehicle to protect a side portion of a passenger, but the curtain airbag is configured to protect the head of the passenger without tilting the seatback rearward. Therefore, in a situation (hereinbelow, which will be referred to as 'reclined state') where the seatback is inclined rearward so that the passenger's head is separated from a protection range of the curtain airbag, it is impossible for the passenger's head to be protected by the curtain airbag.

Furthermore, in case of a side airbag provided at a side portion of the seat to protect the chest, stomach, and pelvis of the passenger, in the reclined state of the seat as described above, an angle of the seatback with respect to a seat cushion is increased, so that the protection for the passenger's pelvis may be insufficient or impossible.

The foregoing is intended merely to aid in the understanding of the background of the present invention, and is not intended to mean that the present invention falls within the purview of the related art that is already known to those skilled in the art.

SUMMARY

The present invention is intended to provide a seat airbag, wherein the seat airbag being capable of improving the side-collision-protection performance and of increasing the productivity of the vehicle, such that in a reclined state where the seat of the vehicle is substantially tilted rearward, when a side collision of the vehicle occurs, the seat airbag is configured to allow the passenger's chest, stomach, as well as the head and pelvis, to be stably protectable.

In order to achieve the above objective, according to one aspect of the present invention, there is provided a seat airbag including: a cushion part mounted to a seatback of a seat, and including at least two chambers connected to each other in a vertical direction of the seatback; and an inflator provided to supply inflating gas to the cushion part.

The cushion part may include: a base chamber provided to protect chest and stomach of a passenger; and an upper chamber connected to an upper portion of the base chamber to protect head of the passenger.

The cushion part may include a lower chamber provided below the base chamber to protect pelvis of the passenger.

The inflator may be disposed to discharge the inflating gas in a direction from the base chamber of the cushion part toward the lower chamber.

The inflator may be provided in a diffuser pocket together with a diffuser, the diffuser pocket being provided in the cushion part; and the diffuser pocket may have a lower hole open toward the lower chamber and an upper hole open toward the base chamber.

The base chamber and the lower chamber may be partitioned by a partition membrane connected to the diffuser pocket.

A vent hole configured to discharge outward the inflating gas supplied from the inflator may be provided in the base chamber.

A volume of the upper chamber may be formed smaller than a volume of the base chamber.

A volume of the lower chamber may be formed smaller than a volume of the base chamber.

At least one communication path may be provided between the upper chamber and the base chamber, and the at least one communication path may be formed by a media forming a thickness less than maximum thickness of the upper chamber and the base chamber or by a non-inflating area.

A vent hole configured to discharge outward the inflating gas supplied from the inflator may be formed only in the base chamber; and minimum diameter of the communication path may be formed larger than a diameter of the vent hole.

The base chamber and the lower chamber of the cushion part may be partitioned from each other by a diffuser pocket accommodating the inflator therein and communicating the base chamber to the lower chamber and by a partition membrane connected to the diffuser pocket; and a portion with a diffuser pocket of the cushion part may be fixed to a side portion of the seatback of the seat.

A seat airbag may include: a cushion part including a base chamber provided at a side portion of a seatback of a seat and configured to inflate toward a front space of the seatback, and an upper chamber configured to inflate upward on the base chamber by inflating gas supplied from the base chamber; and an inflator provided to supply the inflating gas to the cushion part.

The cushion part may further include a lower chamber configured to inflate downward below the base chamber; the lower chamber may be configured to inflate to a position where pelvis of a passenger in the seat may be protectable against a side impact of the seat by being surrounded by the lower chamber; and the upper chamber may be configured to inflate to a position where head of the passenger in the seat may be protectable against a side impact of the seat by being surrounded by the upper chamber.

The base chamber, the upper chamber, and the lower chamber may be configured to communicate with each other; and the base chamber and the lower chamber may be configured to communicate with each other by a diffuser pocket accommodating the inflator therein.

The diffuser pocket may have an upper hole communicating with the base chamber and a lower hole communicating with the lower chamber; the inflator may be disposed to discharge the inflating gas toward the lower hole; and an outer portion of the diffuser pocket may be connected to a partition wall partitioning the base chamber and the lower chamber from each other.

The base chamber may have a vent hole configured to discharge the inflating gas discharged from the inflator to an outside space of the cushion part.

At least one communication path may be provided between the upper chamber and the base chamber, and the at least one communication path may be formed by a media or a non-inflating area.

Minimum diameter of the communication path may be formed larger than a diameter of the vent hole.

Both a volume of the upper chamber and a volume of the lower chamber may be formed smaller than a volume of the base chamber.

According to the present invention, in a reclined state where the seat of the vehicle is substantially tilted rearward, when a side collision of the vehicle occurs, the seat airbag is configured to allow the passenger's chest and stomach as well as the head and pelvis to be stably protectable. Accordingly, the side-collision-protection performance can be improved and the productivity of the vehicle can be increased.

DETAILED DESCRIPTION

Figure 1:
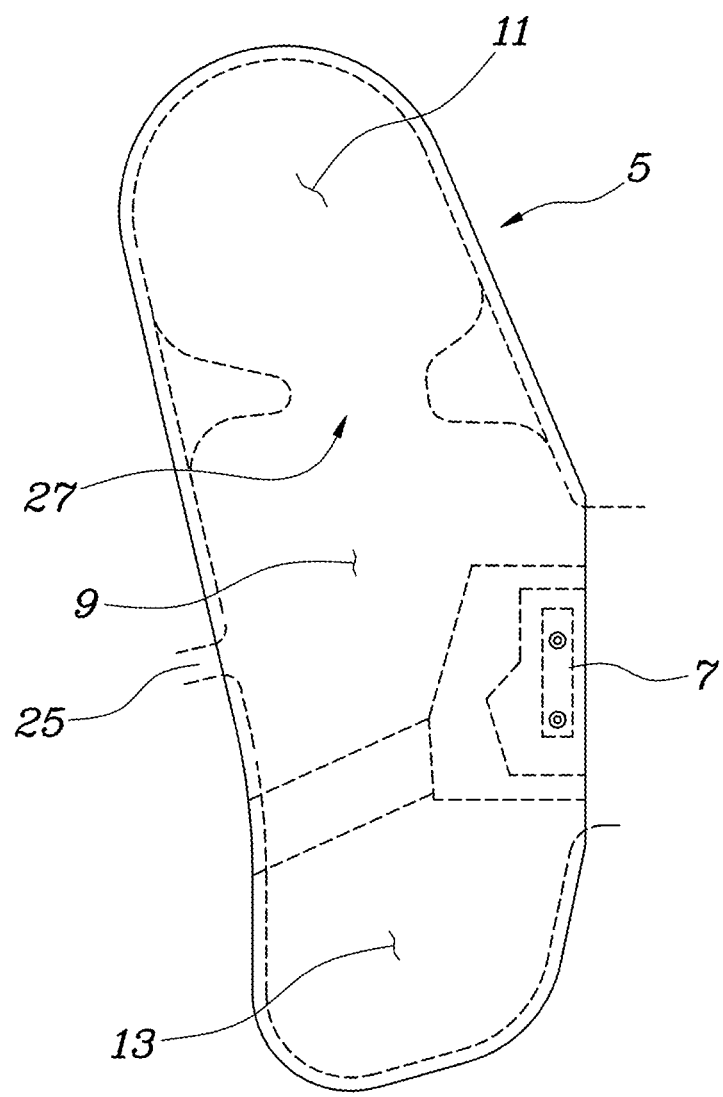
FIG. 1 is a view showing a structure of a seat airbag according to the present invention.

Hereinbelow, a preferred embodiment described in the specification will be described in detail with reference to accompanying drawings, and regardless of the reference numerals, the same reference numerals will refer to the same or like parts, and redundant descriptions thereof will be omitted.

The suffixes "module and "part" for the components used in the following description are given or mixed in consideration of only the ease of writing the specification, and do not have distinct meanings or roles by themselves.

In the following description, if it is decided that the detailed description of known function or configuration related to the invention makes the subject matter of the invention unclear, the detailed description is omitted. Furthermore, the accompanying drawings are only for understanding of the preferred embodiments of the present invention, and the technical ideas disclosed in the specification are not limited by the accompanying drawings, and those skilled in the art will appreciate that various modifications, additions and substitutions are possible, without departing from the scope and spirit of the invention as disclosed in the accompanying claims.

It will be understood that, although the terms first and/or second, etc. may be used herein to describe various elements, these elements should not be limited by these terms. These terms are only used to distinguish one element, from another element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Furthermore, a unit or a control unit included in names such as a motor control unit (MCU), a hybrid control unit (HCU), etc. is only a widely used term for a controller that controls a specific function of a vehicle, and does not mean a generic function unit.

The controller may include a communication device communicating with other controllers or a sensor to control the function in charge, a memory storing an operation system or a logic command and input/output information, and at least one process performing determination, calculation, and decision necessary for controlling the function in charge.

Referring to FIGS. 1 to 4, according to an embodiment of the present invention, a seat airbag includes a cushion part 5 mounted to a seatback 3 of a seat 1, and including at least two chambers connected or accessible to each other in a vertical direction of the seatback 3; and an inflator 7 supplying an inflating gas to the cushion part 5.

The cushion part 5 includes: a base chamber 9 provided to protect the chest and stomach of a passenger; an upper chamber 11 connected to an upper portion of the base chamber 9 and provided to protect the head of the passenger; and a lower chamber 13 provided to protect the pelvis of the passenger and provided at a lower portion of the base chamber 9.

In other words, when the cushion part is mounted to the seatback 3 and the seatback 3 is tilted in forward and rearward directions of the seat, the cushion part 5 mounted to the seatback 3 and moving together with the seatback 3 includes, with the base chamber 9 as the center, the upper chamber 11 at the upper side of the base chamber 9 and the lower chamber 13 at the lower side of the base chamber 9. Even in a reclined state of the seat, in an event such as a side collision of a vehicle, the upper chamber 11 may protect the passenger's head, the lower chamber 13 may protect the passenger's pelvis, and the base chamber 9 may protect the passenger's chest and stomach.

Therefore, with the seat airbag of the present invention, without a separate curtain airbag or a separate side airbag, the passenger's pelvis, chest, stomach, and head can be protected from an impact applied from the side of the vehicle in all available status of the seatback 3.

The inflator 7 is disposed to discharge the inflating gas in a direction; from the base chamber 9 of the cushion part 5 to the lower chamber 13.

Therefore, in the cushion part 5, the lower chamber 13 inflates first. Since a vehicle portion where an impact penetrates the indoor space and the indoor space is reduced is a portion where the passenger's pelvis in an event of a side collision of the vehicle, and considering the location, the lower chamber 13 inflates first to protect the passenger's pelvis.

The inflator 7 is provided inside a diffuser pocket 17 in the cushion part 5 with the diffuser 15; and the diffuser pocket 17 includes a lower hole 19 open toward the lower chamber 13 and an upper hole 21 open toward the base chamber 9.

Furthermore, the base chamber 9 and the lower chamber 13 are partitioned by a partition membrane 23 connected to the diffuser pocket 17.

Therefore, the inflating gas discharged from the inflator 7 to the lower hole 19 of the diffuser pocket 17 passes through the lower chamber 13 as shown in FIG. 3, and then passes again through the diffuser pocket 17 to inflate the base chamber 9 at the upper side.

Of course, since the diffuser pocket 17 includes the upper hole 21, some of the gas discharged from the inflator 7 may be directly supplied into the base chamber 9 through the upper hole 21 without passing through the lower chamber 13.

As described above, the inflating gas supplied into the base chamber 9 is transferred to the upper chamber 11 so that the upper chamber 11 inflates, and some of the inflating gas is discharged to the outside space of the cushion part through a vent hole 25 so as to absorb an impact generated due to contact between the passenger and the airbag.

At this point, the vent hole 25 through which the inflating gas supplied from the inflator 7 is discharged to the outside space is formed only in the base chamber 9, so that it is possible to achieve impact-absorbing of the passenger as described above, and to allow the upper chamber 11 and the lower chamber 13 that need relatively stronger supporting force to maintain proper inflating pressure.

A volume of the upper chamber 11 is formed smaller than a volume of the base chamber 9. Furthermore, a volume of the lower chamber 13 is formed smaller than the volume of the base chamber.

Therefore, as described above, the upper chamber 11 and the lower chamber 13 can support respectively the passenger's head and pelvis by relatively higher pressure compared to the base chamber 9.

At least one communication path 27 is provided between the upper chamber 11 and the base chamber 9, and the at least one communication path 27 is formed by a media forming a thickness less than the maximum thickness of the upper chamber 11 and the base chamber 9 or a non-inflating area.

Therefore, the inflating gas of the base chamber 9 is supplied to the upper chamber 11 through the communication path 27, so that the upper chamber 11 inflates.

At this point, the minimum diameter of the communication path 27 is formed larger than a diameter of the vent hole 25 so as to allow precise and rapid inflation of the upper chamber 11 to be performed.

Figure 2:
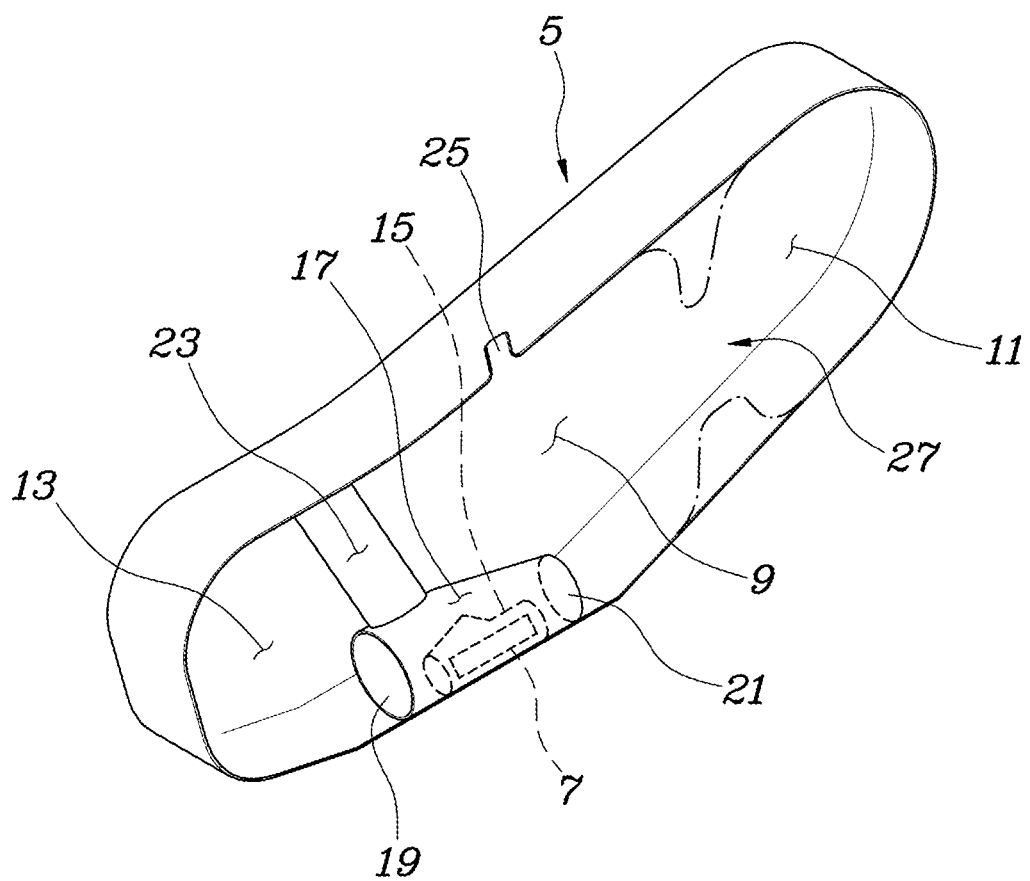
FIG. 2 is a view showing an internal structure of the seat airbag in FIG. 1 by partially cutting the seat airbag.
Figure 3:
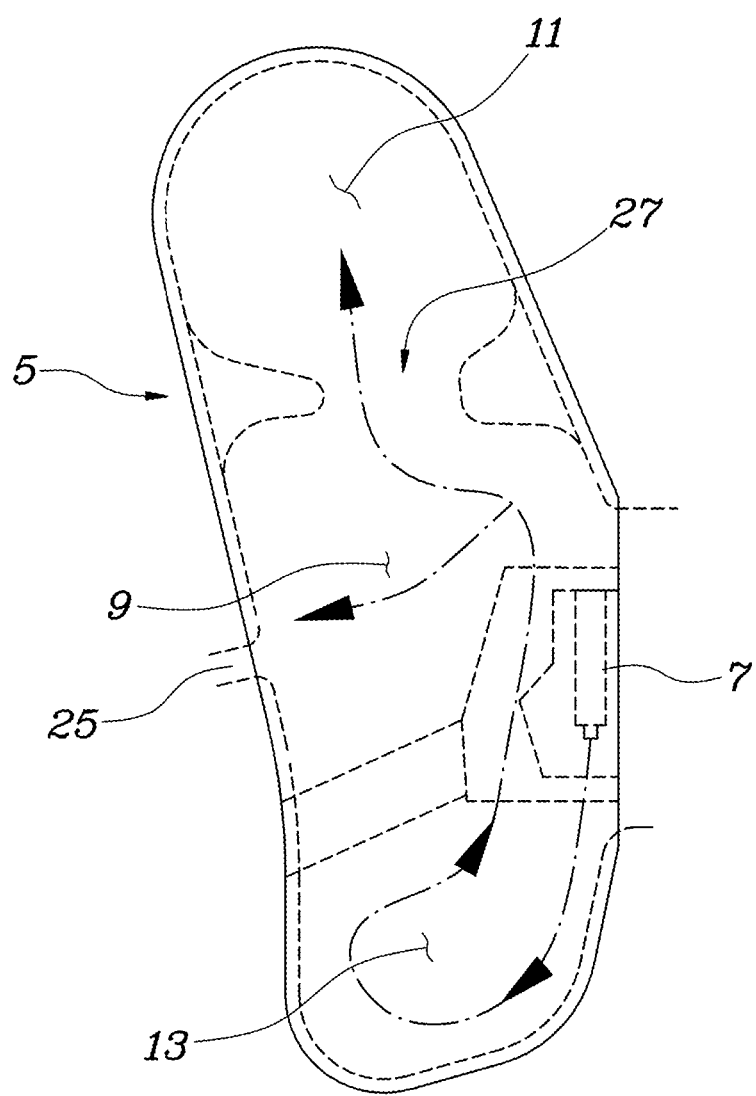
FIG. 3 is a view showing a flow of an inflating gas of the seat airbag in FIG. 1.

A conventional tether, etc. may be used as the media, and the non-inflating area may be provided by preventing, for example, a portion marked by an alternated long and short dash line as shown in FIG. 2 from inflating by in a sewing or bonding manner.

In the embodiment, the base chamber 9 and the lower chamber 13 of the cushion part 5 are partitioned from each other by the diffuser pocket 17, which accommodates the inflator 7 therein and allows the base chamber 9 and the lower chamber 13 to communicate with each other, and the partition membrane 23 connected to the diffuser pocket 17; and the portion with the diffuser pocket 17 of the cushion part 5 is fixed to a side portion of the seatback 3 of the seat 1.

Figure 4:
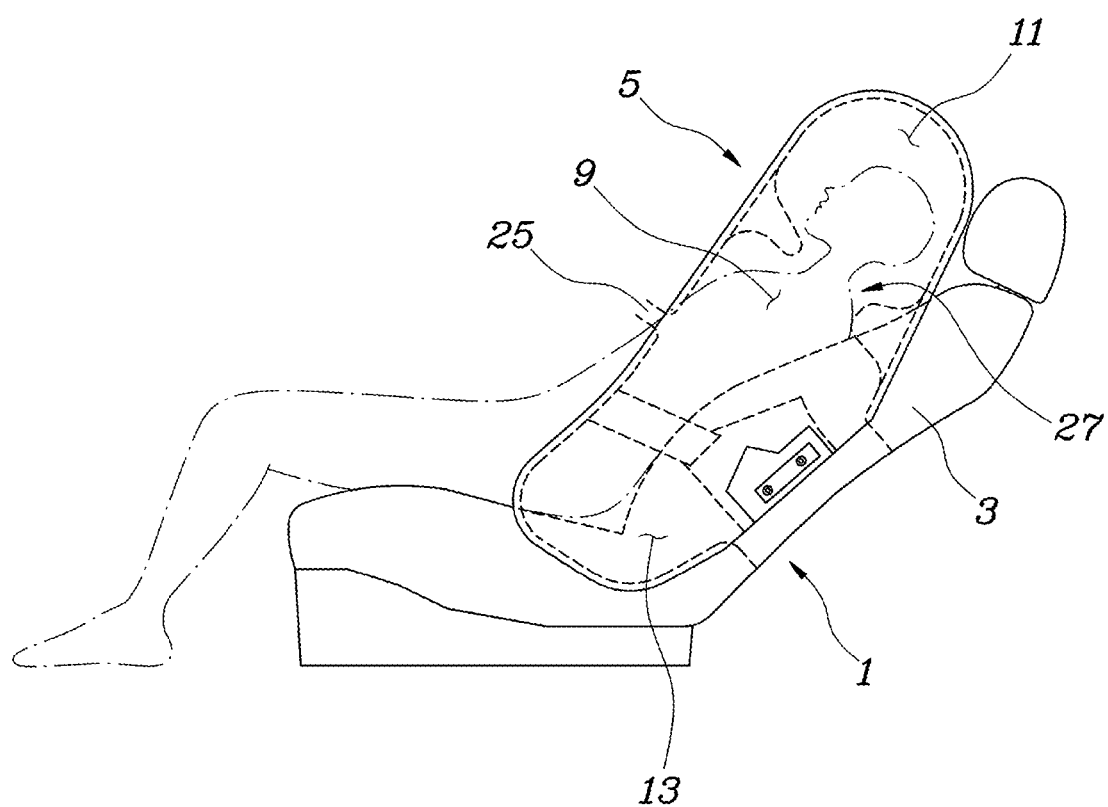
FIG. 4 is an example view showing a status of the seat airbag in FIG. 1 mounted to a seat.

Therefore, as shown in FIG. 4, even when the seatback 3 is tilted rearward to be in an inclined status, the cushion part 5 has a rearward inclined status together with the seatback 3, so that in an event of a side collision of the vehicle, the stomach and chest of the passenger in the reclined seat 1, as well as the passenger's head and pelvis, can be protected.

The seat airbag of the present invention configured as described above may be described as follows.

In other words, the seat airbag of an embodiment of the present invention includes: the cushion part 5 including the base chamber 9 configured to inflate from the side portion of the seatback 3 of the seat 1 toward the front side of the seatback 3, and the upper chamber 11 configured to inflate upward from the base chamber 9 by the inflating gas supplied from the base chamber 9; and the inflator 7 configured to supply the inflating gas to the cushion part 5.

The cushion part 5 includes the lower chamber 13 inflating downward from the base chamber 9; and the lower chamber 13 inflates to a position where the passenger's pelvis on the seat 1 is protectable against a side impact of the seat 1 by being surrounded by the lower chamber 13; and the upper chamber 11 is configured to inflate to a position where the passenger's head on the seat 1 is protectable against the side impact of the seat 1 by being surrounded by the upper chamber.

The base chamber 9, the upper chamber 11, and the lower chamber 13 are configured to communicate with each other; and the base chamber 9 and the lower chamber 13 are configured to communicate with each other through the diffuser pocket 17 accommodating the inflator 7 therein.

The diffuser pocket 17 has the upper hole 21 communicating with the base chamber 9 and the lower hole 19 communicating with the lower chamber 13; the inflator 7 is disposed to discharge the inflating gas toward the lower hole 19; and an outer portion of the diffuser pocket 17 is connected to a partition wall partitioning the base chamber 9 and the lower chamber 13 from each other.

The base chamber 9 has the vent hole 25 discharging the inflating gas discharged from the inflator 7 to the outside space of the cushion part 5.

The at least one communication path 27 formed by the media or the non-inflating area may be provided between the upper chamber 11 and the base chamber 9, and the minimum diameter of the communication path 27 may be formed larger than a diameter of the vent hole 25.

Furthermore, both the volume of the upper chamber 11 and the volume of the lower chamber 13 may be formed smaller than the volume of the base chamber 9.

Although the preferred embodiment of the present invention has been disclosed in detail only with respect to the above specific embodiment, those skilled in the art will appreciate that various modifications, additions, and substitutions are possible, without departing from the spirit and scope of the present invention, and it is appropriate that the various modifications, additions, and substitutions belong to the accompanying claims.

What is claimed is:

1. A seat airbag comprising:
a cushion part mounted to a seatback of a seat, and comprising at least three chambers accessible to each other in a vertical direction of the seatback; and
an inflator provided to supply an inflating gas to the cushion part,
wherein the cushion part further comprises a base chamber, an upper chamber connected to an upper portion of the base chamber, and a lower chamber provided below the base chamber, and
wherein the base chamber and the lower chamber of the cushion part are partitioned from each other by (1) a diffuser pocket accommodating the inflator therein and communicating the base chamber to the lower chamber, and (2) a partition membrane connected to the diffuser pocket.

2. The seat airbag of claim 1, wherein the base chamber is configured to protect a chest and stomach of a passenger and the upper chamber is configured to protect a head of the passenger.

3. The seat airbag of claim 2, wherein the lower chamber is configured to protect a pelvis of the passenger.

4. The seat airbag of claim 3, wherein the inflator is disposed to discharge the inflating gas from the base chamber of the cushion part toward the lower chamber.

5. The seat airbag of claim 4, wherein the inflator is provided together with a diffuser in a diffuser pocket, the diffuser pocket being within the cushion part; and
   the diffuser pocket has a lower hole open toward the lower chamber and an upper hole open toward the base chamber.

6. The seat airbag of claim 5, wherein the base chamber and the lower chamber are partitioned by a partition membrane connected to the diffuser pocket.

7. The seat airbag of claim 4, wherein a vent hole located in the base chamber is configured to discharge the inflating gas outward from the inflator.

8. The seat airbag of claim 4, wherein a volume of the upper chamber is smaller than a volume of the base chamber.

9. The seat airbag of claim 4, wherein a volume of the lower chamber is smaller than a volume of the base chamber.

10. The seat airbag of claim 4, wherein at least one communication path is provided between the upper chamber and the base chamber, the at least one communication path being formed (1) by a media having a thickness less than a maximum thickness of the upper chamber and the base chamber, or (2) by a non-inflating area.

11. The seat airbag of claim 10, wherein a vent hole formed only in the base chamber is configured to discharge the inflating gas supplied from the inflator outward; and
    the minimum diameter of the communication path is larger than a diameter of the vent hole.

12. The seat airbag of claim 4, wherein
    a portion of the cushion part with the diffuser pocket is fixed to a side portion of the seatback of the seat.

13. A seat airbag comprising:
    a cushion part comprising a base chamber provided at a side portion of a seatback of a seat and configured to inflate toward a front space of the seatback, and an upper chamber configured to inflate upward on the base chamber by an inflating gas supplied from the base chamber; and
    an inflator configured to supply the inflating gas to the cushion part,
    wherein:
      the cushion part further comprises a lower chamber configured to inflate downward below the base chamber;
      the lower chamber is configured to inflate to a position where a pelvis of a passenger in the seat is protectable against a side impact of the seat by being surrounded by the lower chamber; and
      the upper chamber is configured to inflate to a position where a head of the passenger in the seat is protectable against a side impact of the seat by being surrounded by the upper chamber.

14. The seat airbag of claim 13, wherein the base chamber, the upper chamber, and the lower chamber are configured to communicate with each other; and
    the base chamber and the lower chamber are configured to communicate with each other via a diffuser pocket accommodating the inflator therein.

15. The seat airbag of claim 14, wherein:
    the diffuser pocket has an upper hole communicating with the base chamber and a lower hole communicating with the lower chamber;
    the inflator is disposed to discharge the inflating gas toward the lower hole; and
    an outer portion of the diffuser pocket is connected to a partition wall partitioning the base chamber and the lower chamber from each other.

16. The seat airbag of claim 15, wherein the base chamber has a vent hole arranged to discharge the inflating gas discharged from the inflator to an outside space of the cushion part.

17. The seat airbag of claim 16, wherein at least one communication path is provided between the upper chamber and the base chamber, and the at least one communication path is formed by a media or a non-inflating area.

18. The seat airbag of claim 17, wherein the minimum diameter of the communication path is formed larger than a diameter of the vent hole.

19. The seat airbag of claim 18, wherein a volume of the upper chamber and a volume of the lower chamber each is smaller than a volume of the base chamber.

* * * * *